(12) United States Patent
Makki et al.

(10) Patent No.: US 11,509,391 B2
(45) Date of Patent: Nov. 22, 2022

(54) ADAPTIVE MULTIPLE ACCESS SCHEME IN INTEGRATED ACCESS AND BACKHAUL NETWORKS

(71) Applicant: Telefonaktiebolaget LM Ericsson (publ), Stockholm (SE)

(72) Inventors: Behrooz Makki, Gothenburg (SE); Mikael Coldrey, Borås (SE); Mona Hashemi, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 508 days.

(21) Appl. No.: 15/767,181

(22) PCT Filed: Feb. 15, 2018

(86) PCT No.: PCT/EP2018/053834
§ 371 (c)(1),
(2) Date: Apr. 10, 2018

(87) PCT Pub. No.: WO2019/158206
PCT Pub. Date: Aug. 22, 2019

(65) Prior Publication Data
US 2019/0253136 A1    Aug. 15, 2019

(51) Int. Cl.
*H04L 12/00*    (2006.01)
*H04B 7/26*    (2006.01)
(Continued)

(52) U.S. Cl.
CPC ......... *H04B 7/2615* (2013.01); *H04B 7/0617* (2013.01); *H04L 5/0064* (2013.01);
(Continued)

(58) Field of Classification Search
None
See application file for complete search history.

(56) References Cited

U.S. PATENT DOCUMENTS

2015/0312074 A1  10/2015 Zhu et al.
2015/0351081 A1  12/2015 Zhu et al.
(Continued)

FOREIGN PATENT DOCUMENTS

CN    106230557 A    12/2016
CN    107105493 A    8/2017
(Continued)

OTHER PUBLICATIONS

Non-Orthogonal Multiple Access in Coordinated Direct and Relay Transmission (Year: 2015).*
(Continued)

*Primary Examiner* — Noel R Beharry
*Assistant Examiner* — Lionel Preval
(74) *Attorney, Agent, or Firm* — Rothwell, Figg, Ernst & Manbeck, P.C.

(57) ABSTRACT

A method for integrating access and backhaul links, the method includes: obtaining information indicating a data rate requirement for a link between a first AP and a second AP; obtaining information indicating a gain of the link between the first AP and the second AP; computing, using the gain of the link, an achievable data rate for the link between the first AP and the second AP, wherein the achievable data rate is computed based on an OMA scheme; determining that the data rate requirement is greater than the achievable data rate; and as a result of determining that the data rate requirement is greater than the achievable data rate, pairing a first UE with the first AP, such that a NOMA scheme is used for the link between the first AP and second AP and the link between the first AP and the first UE.

16 Claims, 12 Drawing Sheets

(51) Int. Cl.
*H04B 7/06* (2006.01)
*H04W 88/10* (2009.01)
*H04W 88/14* (2009.01)
*H04W 72/04* (2009.01)
*H04L 5/00* (2006.01)
*H04B 7/0452* (2017.01)
*H04L 27/26* (2006.01)
*H04L 25/00* (2006.01)

(52) U.S. Cl.
CPC ....... *H04W 72/0446* (2013.01); *H04W 88/10* (2013.01); *H04W 88/14* (2013.01); *H04B 7/0452* (2013.01); *H04L 25/00* (2013.01); *H04L 27/26* (2013.01)

(56) References Cited

U.S. PATENT DOCUMENTS

| | | | | |
|---|---|---|---|---|
| 2016/0119807 | A1* | 4/2016 | Sun | H04L 1/0029 370/252 |
| 2016/0205695 | A1 | 7/2016 | Kishiyama et al. | |
| 2017/0251462 | A1 | 8/2017 | Chae et al. | |
| 2018/0124684 | A1* | 5/2018 | Kwon | H04L 5/0064 |
| 2018/0176815 | A1* | 6/2018 | Hojeij | H04W 72/1215 |
| 2019/0021084 | A1* | 1/2019 | Stirling-Gallacher | H04W 16/28 |

FOREIGN PATENT DOCUMENTS

| | | |
|---|---|---|
| CN | 107258067 A | 10/2017 |
| CN | 107682135 A | 2/2018 |
| WO | 2017/139005 A1 | 8/2017 |
| WO | 2018/021592 A1 | 2/2018 |

OTHER PUBLICATIONS

International Search Report and Written Opinion issued in International Application No. PCT/EP2018/053834, dated Oct. 22, 2018, 16 pages.

Kim, Jung-Bin et al., "Non-Orthogonal Multiple Access in Coordinated Direct and Relay Transmission", IEEE Communications Letters, vol. 19, No. 11, Nov. 1, 2015 (pp. 2037-2040).

Liu, Yiming et al., "A Multiple APs Cooperation Access Scheme for Energy Efficiency in UUDN with NOMA", 2017 IEEE Conference on Computer Communications Workshops (Infocom Wkshops): GI 2017: 20th IEEE Global Internet Symposium, May 1, 2017 (pp. 892-897).

3GPP TR 36.866 V12.0.1, 3rd Generation Partnership Project; Technical Specification Group Radio Access Network; Study on Network-Assisted Interference Cancellation and Suppression (NAIC) for LTE (Release 12), Mar. 2014, 64 pages.

3GPP TSG RAN Meeting #67, RP-150496, "Study on Downlink Multiuser Superposition Transmissions for LTE", MediaTek Inc., Shanghai, China, Mar. 2015, 7 pages.

3GPP TSG RAN WG1 Meeting #86, R1-166056, "Final Report of 3GPP TSG RAN WG1 #85 v1.0.0", MCC Support, Göteborg, Sweden, Aug. 2016, 170 pages.

Xu, Peng et al., "NOMA: An Information Theoretic Perspective", IEEE, arXiv: 1504.07751v2 [cs.IT], May 2015, 6 pages.

\* cited by examiner

ADAPTIVE MULTIPLE ACCESS SCHEME IN INTEGRATED ACCESS AND BACKHAUL NETWORKS

CROSS REFERENCE TO RELATED APPLICATION(S)

This application is a 35 U.S.C. § 371 National Stage of International Patent Application No. PCT/EP2018/053834, filed Feb. 15, 2018, designating the United States, the disclosure of which is incorporated by reference.

TECHNICAL FIELD

Disclosed are embodiments related to non-orthogonal multiple access (NOMA).

BACKGROUND

The design of multiple access schemes is of interest in the design of cellular telecommunication systems. The goal of multiple access schemes is to provide multiple user equipments (UEs) (i.e., wireless communication devices, such as, for example, smartphones, tablets, phablets, smart sensors, wireless Internet-of-Things (IoT) devices, etc., that are capable of wirelessly communicating with an access point) with radio resources in a spectrum, cost, and complexity-efficient manner. In 1G-3G wireless communication systems, frequency division multiple access (FDMA), time division multiple access (TDMA) and code division multiple access (CDMA) schemes have been introduced. Long-Term Evolution (LTE) and LTE-Advanced employ orthogonal frequency division multiple access (OFDMA) and single-carrier (SC)-FDMA as orthogonal multiple access (OMA) schemes. Such orthogonal designs have the benefit that there is no mutual interference among UEs, leading to high system performance with simple receivers.

Recently, non-orthogonal multiple access (NOMA) has received considerable attention as a promising multiple access technique for LTE and 5G systems. With NOMA, two or more UEs may share the same radio resources (e.g., time resources, frequency resources, and/or code resources). Particularly, 3GPP has considered NOMA in different applications. For instance, NOMA has been introduced as an extension of the network-assisted interference cancellation and suppression (NAICS) for intercell interference (ICI) mitigation in LTE Release 12 as well as a study item of LTE Release 13, under the name of "Downlink multiuser superposition transmission." Also, in recent 3GPP meetings, it is decided that new radio (NR) should target to support (at least) uplink NOMA, in addition to the OMA approach.

Wireless networks, particularly 5G systems, have a need for providing high-rate data streams for everyone, everywhere, and at any time. To meet such demands, large bandwidths are used. Such data rates and bandwidths may be achieved by using, e.g., millimeter-wave-based links (including massive multiple-input and multiple-output (MMIMO) links). The presence of very wide bandwidths makes it possible to include the wireless backhaul transport in the same spectrum as the wireless access. For this reason, 3GPP has considered such integrated access and backhaul (IAB) network configurations, where an access point (AP) provides other APs with wireless backhaul connections and provides the UEs inside the AP's cell area with wireless access connections. Such IAB networks can have either a star-like configuration with multiple APs wirelessly backhauled through direct single-hop connections to, e.g., a fiber-connected AP; or a cascade-like configuration with APs wirelessly connected to, e.g., a fiber-connected AP in a multi-hop fashion.

Among the advantageous of IAB networks are the following:

Cost reduction: A fiber optic link is estimated to cost $100,000-$200,000 USD/km in metropolitan areas, with 85% of the total figure tied to trenching and installation. For this reason, as well as the traffic jams and infrastructure displacements, some cities, such as Washington, D.C., have considered a moratorium on fiber trenching specially in historical areas. In such scenarios, millimeter-wave-based wireless backhaul is the best alternative providing (almost) the same rate as fiber optic with significantly less price and no digging.

Link quality enhancement: Compared to the direct macro BS-UE link, less path loss/shadowing, and higher line-of-sight (LOS) connection probability are expected for the wirelessly backhauled AP-UE links within small cells. As a result, better channel quality is experienced in such small cells, compared to the cases with direct macro BS-UE links.

Smart network planning: The next generation of UEs will be equipped with advanced AP-like signal processing and antenna techniques. This, along with the large bandwidth, allows clever scheduling/routing, interference mitigation and resource allocation, to be performed in a cooperative fashion. In the specific use-case scenario of IAB, for example, the objective is to use the same spectrum and hardware for both access and backhaul links. Thus, as opposed to conventional systems, the UEs can support the APs for backhaul data transmission.

SUMMARY

NOMA exploits channel difference between or among UEs to improve spectrum efficiency. Particularly, the highest gain of NOMA is observed in the cases where a "strong" UE (e.g., a UE located close to an access point) and a "weak" UE (e.g., a UE located at or near a cell edge) are paired (i.e., use the same radio resources). However, the implementation of NOMA implies: 1) use of more advanced and complex receivers to enable multiuser signal separation, 2) more difficult synchronization, and 3) a higher signal decoding delay.

In an IAB network, the backhaul link (e.g., an AP-AP link), is typically the bottleneck of the transmission setup. While the AP-UE links need to support low/moderate data rates, the AP-AP backhaul link transfers an aggregated data of multiple UEs and, as a result, should transfer data with high rates. For this reason, improved IAB networks are needed having advance data transmission schemes to satisfy such high rate requirements.

An adaptive IAB network, e.g., that is able to switch between NOMA and OMA schemes, may improve network service availability. For example, in such an adaptive network, the APs may switch between NOMA and OMA schemes based on a data rate requirement. Conventional OMA techniques such as TDMA, FDMA, and/or CDMA support low data rates with low implementation complexity, while NOMA supports higher achievable data rates at the cost of higher implementation complexity. An adaptive IAB network may then, based on the selected multiple access scheme, determine as appropriate the power levels, the beamforming, and the transmit/receive timing for the links. In embodiments, these parameters may be optimized offline and, depending on a requested data rate, the adaptive IAB network may switch between optimized configurations.

Embodiments are applicable to one or more of an uplink and/or downlink transmission.

Embodiments disclosed herein provide a method for adaptively integrating access and backhaul links. For example, the method includes obtaining information indicating a data rate requirement for a link between a first access point (AP) and a second AP; and obtaining information indicating a gain of the link between the first AP and the second AP. The method may further include computing, based on the gain of the link, an achievable data rate for the link between the first AP and the second AP, wherein the achievable data rate is computed based on an orthogonal multiple access (OMA) scheme (e.g., Time Division Multiple Access (TDMA), Frequency Division Multiple Access (FDMA)); determining that a condition is true, wherein determining that the condition is true comprises determining that the data rate requirement is greater than the achievable data rate; and as a result of determining that the condition is true, pairing a first user equipment (UE) with the first AP, such that a non-orthogonal multiple access (NOMA) scheme is used for the link between the first AP and the second AP and the link between the first AP and the first UE.

Advantages that flow from this disclosure include improved service availability and quality of the backhaul (e.g. AP-AP) links, improved error propagation and resource utilization, and improved achievable rates (e.g. on AP-UE links).

BRIEF DESCRIPTION OF THE DRAWINGS

The accompanying drawings, which are incorporated herein and form part of the specification, illustrate various embodiments.

DETAILED DESCRIPTION

Figure 1A:
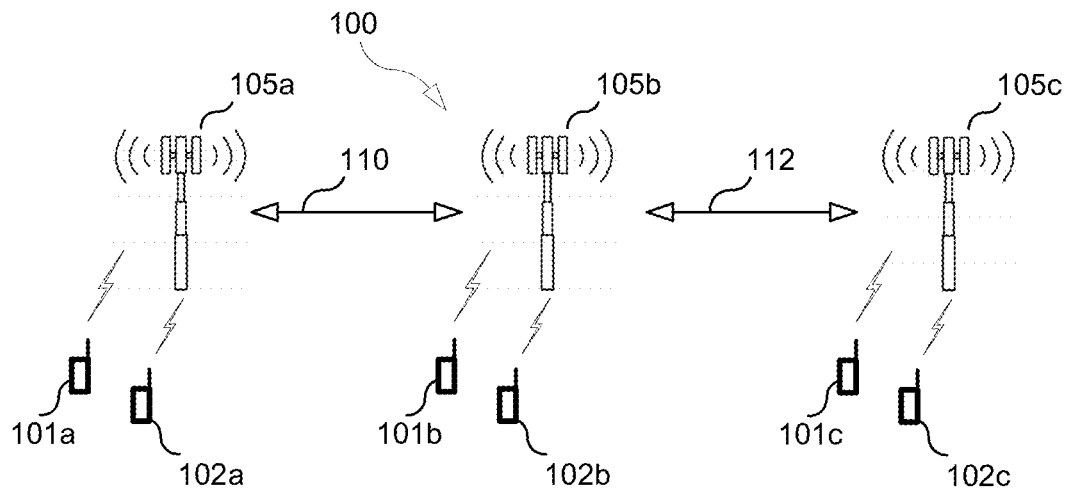
FIGS. 1A and 1B illustrate a network according to some embodiments.

FIG. 1A illustrates a network 100 having three access points (APs) 105a, 105b, 105c (e.g., a 4G or 5G base station or other access point), each serving two UEs (e.g., AP 105a serves UEs 101a and 102a, AP 105b serves UEs 101b and 102b, and AP 105c serves UEs 101c and 102c). In this scenario, AP 105a is connected to AP 105b, and AP 105b is connected to AP 105c, by backhaul AP-AP links 110 and 112, respectively. This illustrates an example for a simple case with two hops (that is, AP 105a can reach AP 105c by using two links, AP-AP link 110 and AP-AP link 112). In other embodiments, network 100 may extend to an arbitrary number of hops and may also include other network configurations such as a star-like network configuration.

Figure 1B:
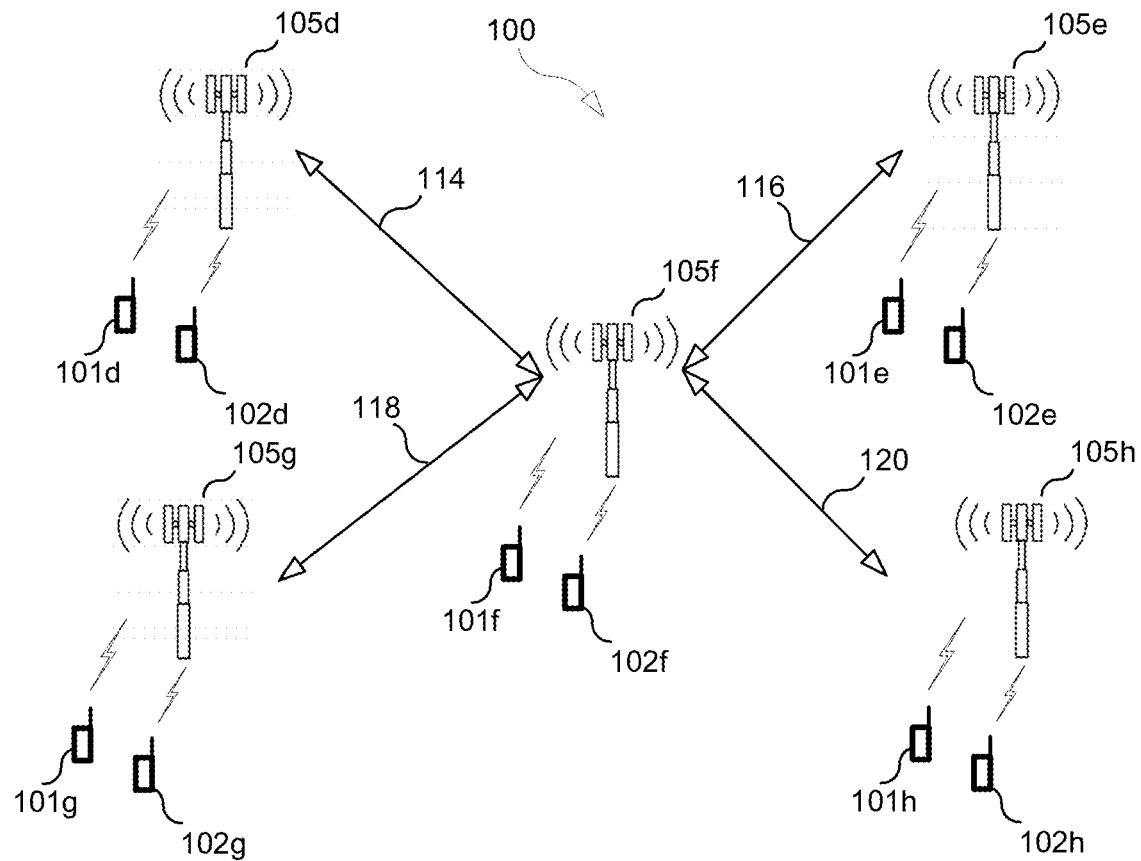

FIG. 1B illustrates a network 100 having five APs 105d-h, each serving two UEs: UE 101d-h and UE 102d-h, respectively. In this scenario, each of AP 105d, 105e, 105g, and 105h is directly connected to AP 105f, by backhaul AP-AP links 114, 116, 118, and 120, respectively. This illustrates an example for a star-like network configuration.

Theoretically, using downlink NOMA with superposition coding at the transmitter and successive interference cancellation (SIC) at the receiver not only outperforms OMA, in terms of sum rate, it is also achieves an optimal maximum capacity region. However, the performance improvement of NOMA is weighed against its costs, e.g. complexity and delay from both synchronization and decoding, as compared to OMA. Weighing these concerns, it is beneficial therefore to use NOMA only if it is required, for example, to achieve a requested data rate. Embodiments optimize this trade-off to take advantage of the improved sum-rate performance, while minimizing complexity and delay from synchronization and decoding.

Figure 2A:
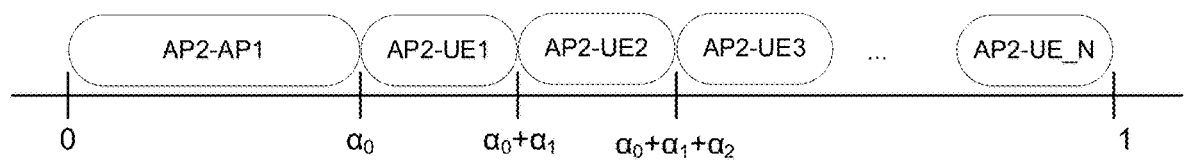
FIGS. 2A, 2B, and 2C, illustrate resource block usage according to some embodiments.
Figure 2B:
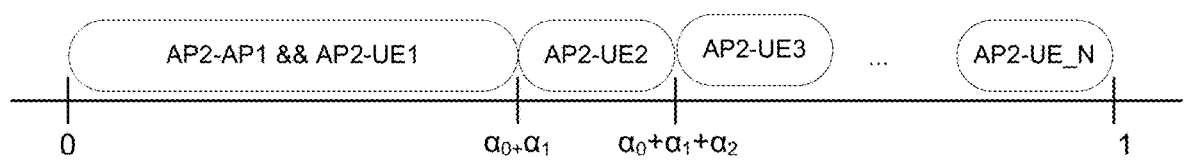
Figure 2C:
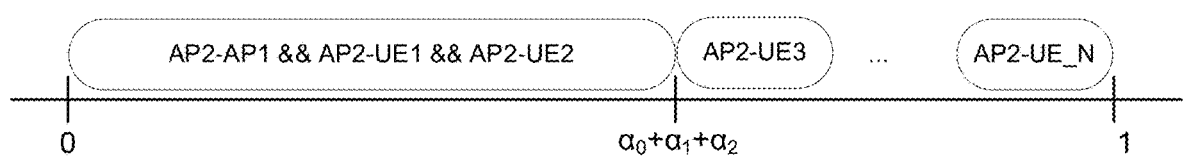

FIGS. 2A-2C show an example of a resource allocation between the AP-AP links (e.g., links 110, 112, 114, 116, 118, 120) and the AP-UE links. For example, in FIG. 2A, the link between a first access point, labeled AP1, (e.g., one of AP 105a-h) and a second access point, labeled AP2 (e.g., another one of AP 105a-h) occupies time slot $\alpha_0$. Likewise, the link between AP2 and a first user equipment, labeled UE1, (e.g., one of UE 101a-h, 102a-h) occupies time slot $\alpha_1$; the link between AP2 and a second user equipment, labeled UE2, (e.g., another one of UE 101a-h, 102a-h) occupies time slot $\alpha_2$; and the link between AP2 and a third user equipment, labeled UE3, (e.g., another one of UE 101a-h, 102a-h) occupies time slot $\alpha_3$. There may be an arbitrary number of UEs (with the N-th UE labeled UE_N), and the time scale is shown as being normalized. Thus, FIG. 2A illustrates an example of an OMA scheme, because each AP and UE has its own, orthogonal resource block (different time slots in this example).

In FIG. 2B, UE1 is paired with AP1, such that the AP2-AP1 link and the AP2-UE1 link share the same time slot, which is time slot $\alpha_0+\alpha_1$ in the example, while UE2 and UE3 (up to UE_N) are not paired and continue to have their own time slots.

In FIG. 2C, both UE1 and UE2 are paired with AP1, such that the AP2-AP1 link, the AP2-UE1 link, and the AP2-UE2 link share the same time slot, which is time slot $\alpha_0+\alpha_1+\alpha_2$ in the example, while UE3 (up to UE_N) are not paired and continue to have their own time slots.

Thus, FIGS. 2B and 2C illustrate examples of a NOMA scheme, because AP2 shares resources with one or more paired UEs. In embodiments, pairing of different UE combinations with AP1 may be achieved by selecting different beams generated by AP2. Beam selection may be optimized so that the power, and other beam parameters, allow the pairing of the desired number of UEs while still maintaining a quality link.

In these examples, time slots are shared for paired UEs, but other resources could also be shared, such as frequency. Embodiments are compatible with any NOMA scheme for paired UEs and/or APs.

Given these different access schemes (e.g., OMA and NOMA), achievable data rates can be calculated for the different links. For example, considering AP2 in the transmission (downlink) mode, the achievable rates of AP1 and $UE_i$, i=1, ..., N (for UEs in AP2's cell), the following equations may be used. To simplify the presentation of the equations, it is assumed for example's sake that there is a single transmit/receive antenna. Similar equations may be used to extend the results to the cases with multiple antennas. In this case, using OMA, the achievable data rates for the AP2-AP1 link ($R_{AP2-AP1,OMA}$) and for the AP2-$UE_i$ link ($R_{UE_i,OMA}$) are given by $$\begin{cases} R_{AP2-AP1,OMA} = \alpha_0 \log_2\left(1 + \frac{Pg}{\alpha_0}\right)\left[\frac{bit}{symbol}\right] & (i) \\ R_{UE_i,OMA} = \alpha_i \log_2\left(1 + \frac{Pg_i}{\alpha_i}\right), i = 1, \ldots, N, \left[\frac{bit}{symbol}\right]. & (ii) \end{cases} \quad (1)$$

Here, P is the transmission power of AP2. Also, g and $g_i$, i=1, N, stand for the gains of the AP2-AP1 link and the AP2-$UE_i$ links, respectively. Further, $\alpha_0$ denotes the portion of time allocated for data transfer in the AP2-AP1 link, while $\alpha_i$, i=1, N, represents the portion of time allocated to $UE_i$, where $\Sigma_{i=0}^{N}\alpha_i=1$.

Because the backhaul links are typically the main bottlenecks of the network, one objective is to improve the performance of the AP2-AP1 link. Let us represent the requested data rate for the AP2-AP1 link by r. If $r \leq R_{AP2-AP1,OMA}$ then the OMA-based scheme can satisfy the data rate requirement with low complexity. If $r > R_{AP2-AP1,OMA}$ however, then the OMA-based scheme cannot satisfy the data rate requirement. In that case, one strategy for improving the backhaul link, is to switch to a NOMA-based scheme. This has the advantage of reducing complexity, since OMA is used where it can support the data rate requirement, and NOMA is only used when it is needed to support the data rate requirement.

Considering now that a NOMA-based scheme is used, let us index the UEs such that $UE_1$ can be served jointly with AP1 with the narrowest beam, and $UE_2$ with the second narrowest beam, and so forth. If UEs i=1, ..., M, M≤N, are paired with AP1 in a NOMA-based approach (and UEs i=M+1, N, are served in orthogonal resources), the achievable rates from Equation (1) may instead be computed by Equation (2) below:

$$\begin{cases} R_{AP2-AP1,NOMA} = \left(\sum_{i=0}^{M} \alpha_i\right) \log_2\left(1 + \frac{\overline{P}_0 g}{\sum_{i=0}^{M} \alpha_i}\right)\left[\frac{bit}{symbol}\right] & (i) \\ R_{UE_i,OMA} = \left(\sum_{i=0}^{M} \alpha_i\right) \log_2\left(1 + \frac{\overline{P}_i g_i}{\left(1 + \left(\overline{P}_0 + \sum_{j=i+1}^{M} \overline{P}_j\right)g_i\right)\sum_{i=0}^{M} \alpha_i}\right), \\ \qquad i = 1, \ldots, M, \left[\frac{bit}{symbol}\right] & (ii) \\ \sum_{i=0}^{M} \overline{P}_i = P \Big/ \sum_{i=0}^{M} \alpha_i, & (iii) \\ R_{UE_i,OMA} = \alpha_{i+1} \log_2\left(1 + \frac{Pg_i}{\alpha_{i+1}}\right), i = M+1, \ldots, N, \left[\frac{bit}{symbol}\right]. & (iv) \end{cases} \quad (2)$$

Here, the achievable rates are given based on the assumption that the signal-to-noise ratios (SNRs) are ordered as $SNR_{AP2-UE_1} \leq \ldots \leq SNR_{AP2-UE_M} \leq SNR_{AP2-AP1}$. In this way, depending on the required capacity of the AP2-AP1 link, AP1 is paired with a number of closest UEs and, the achievable rate of the AP2-AP1 link increases through NOMA-based data transmission. Here, also, P is the transmission power of AP2, and $\overline{P}_0$ denotes the portion of the transmission power directed to AP1, and $\overline{P}_i$ denotes the portion of the transmission power directed to the respective paired UEs.

The above equation considered downlink. As another example, considering AP2 in the reception (uplink) mode, the equations may be modified as follows:

$$\begin{cases} R_{AP1-AP2,NOMA} = \left(\sum_{i=0}^{M} \alpha_i\right) \log_2\left(1 + \frac{Pg}{\sum_{i=0}^{M} \alpha_i}\right)\left[\frac{bit}{symbol}\right] & (i) \\ R_{UE_i,NOMA} = \left(\sum_{i=0}^{M} \alpha_i\right) \log_2\left(1 + \frac{P_i g_i}{\left(1 + Pg + \sum_{j=i+1}^{M} P_j g_j\right)\sum_{i=0}^{M} \alpha_i}\right), \\ \qquad i = 1, \ldots, M, \left[\frac{bit}{symbol}\right] & (ii) \\ R_{UE_i,OMA} = \alpha_{i+1} \log_2\left(1 + \frac{P_i g_i}{\alpha_{i+1}}\right), i = M+1, \ldots, N, \left[\frac{bit}{symbol}\right]. & (iii) \end{cases} \quad (3)$$

Here, considering FIG. 2, $g_i$ is the channel gain of the $UE_i$-AP2, i=1, N, link. Also, P is the power used by AP1 and $P_i$ is the power of the $UE_i$, i=1, ..., N. In the uplink setup, there is no sum power constraint, i.e., equation (2.iii) of the downlink is not needed. However, this is for the case when AP1 pairs with $UE_i$, i=1, ..., N.

In some embodiments, the UEs are stationary and, as a result, the gains of the corresponding links (e.g. their pathloss values) are known beforehand. Thus, rules for the best selection of UE(s) for pairing, and adaptation of both the beamforming and the power, may be determined offline. In such embodiments, based on an instantaneous data rate request, the network may immediately switch to an appropriate multiple access scheme to achieve optimal results, and in doing so may adapt the corresponding beamforming, time slots, and power levels accordingly. The signaling procedure for this setup is as follows.

Step 1

AP2 obtains data rate requirements for one or more of AP1 and $UE_i$, i=1, ..., N, (for UEs belonging to AP2's cell). In some embodiments, such as for handling of uplinks (data sent to AP2), one or more of AP1 and $UE_i$, i=1, ..., N, may send their data rate requirements to AP2. In some embodiments, such as for handling of downlinks (data sent from AP2), AP2 may determine data rate requirements from e.g. a transmit buffer.

Step 2

Based on the gains of the AP-AP and AP-UE links (e.g., known because they are stationary, or otherwise obtained), and the one or more data rate requirements, AP2 determines the appropriate multiple access scheme, with the minimum number of paired nodes, such that the implementation cost of the NOMA is minimized. Pairing of one or more UEs with an AP means that the one or more UEs and the AP utilize NOMA-based schemes, e.g. they share a resource such as time or frequency for transmitting or receiving.

Step 3

AP2 informs the paired nodes about the selected multiple access scheme (e.g., NOMA), as well as their beamforming/power levels.

Step 4

All nodes (paired or not) of the network are informed about the new timing procedure and their signals are synchronized. (Or, if frequency is the resource that is shared, instead of time, the nodes are informed about the new frequency procedure and their signals are synchronized. Likewise for other multiple access schemes.) This is advantageous, for example, because a multi-hop IAB setup is based on a decode-and-forward relaying procedure. Also, the time slots' durations, as well as the message decoding delays, differ depending on the number of paired nodes. Thus, all nodes of the network, for instance other APs such as AP3 and its corresponding UEs, should synchronize their transmit/receive timings based on the selected multiple access scheme.

Figure 3:
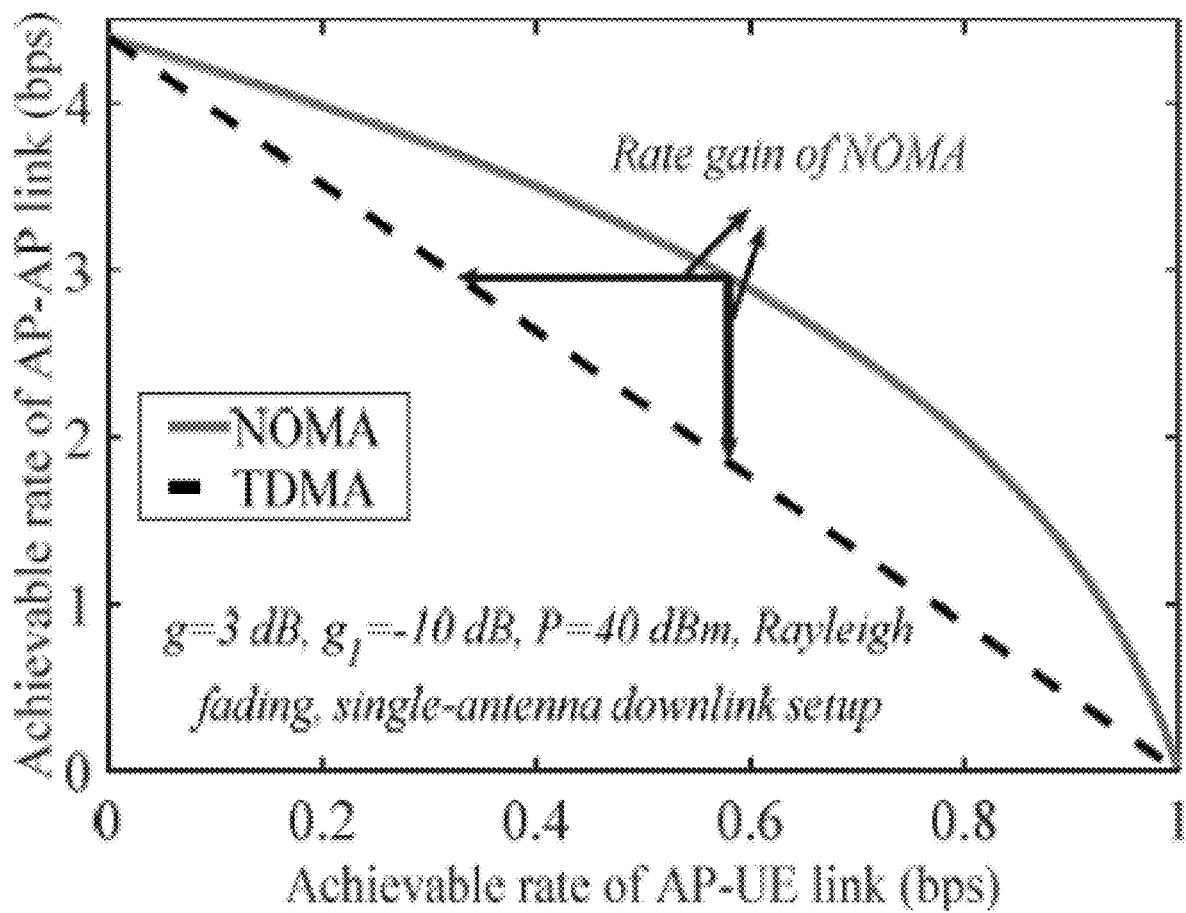
FIG. 3 is a graph illustrating the achievable data rate between AP-AP and AP-UE links for both NOMA-based and TDMA-based transmission.

FIG. 3 shows a chart illustrating achievable data rates of different links for different multiple access schemes. Specifically, for both an OMA scheme (TDMA) and a NOMA scheme, the achievable data rate of the AP-UE link is plotted against the achievable data rate of the AP-AP link. The results are presented for the cases with Rayleigh fading, single transmit/receive antenna and one UE. Also, P=40 dBm, and $g_1$32-10 dB and g=3 dB in the AP2-AP1 and AP2-UE links, respectively. As it can be seen, while TDMA is helpful at low data rates with low implementation complexity, NOMA-based transmission leads to remarkable increase in the achievable data rates of different links. Thus, depending on the data rate requirement and implementation complexity, a node may advantageously switch to different multiple access setups. Also, the system performance will improve if the number of antennas and/or the number of UEs increase. In this way, embodiments increase service availability and quality of the IAB network for higher data rate requirements, and effectively balance the tradeoff between complexity and achievable data rates.

One issue with NOMA-based access schemes is that channel state information (CSI) acquisition may be complicated. IAB networks, however, are mainly designed for connections to stationary and/or slow-moving nodes (such as found in houses and offices), for which the channels (or links) remain constant for a very long time. In such cases, there is no need for CSI estimation and feedback in every time slot. Instead, if the gains change (e.g., due to a truck cutting one of the links), then the CSI, the multiple access rule (e.g. precomputed offline), and the corresponding parameter settings, can be updated accordingly, when the change in the gains is reported, observed, and/or otherwise determined.

In embodiments, the effect of blockage of a link is reduced. For example, if an AP-AP link is blocked by, e.g., a passing truck, one solution is to use wider beams. Embodiments provide for using these wider beams to serve UEs in the same time/frequency resources as the APs, and improve their achievable data rates.

In embodiments, performance may depend on finding an appropriate UE that can be covered jointly with the AP, and with reasonably narrow beams. With dense networks having a moderate to large number of UEs per cell, which is of particular interest in 5G, the probability of finding such a good node increases significantly.

Embodiments are applicable for various network configurations, including a multi-hop IAB configuration and a star-like IAB configuration. In a star-like configuration, the time synchronization may be easier, compared to the cases with multiple hops, because the wireless-backhaul APs work independently, and may therefore require less signaling to synchronize.

Embodiments provide for pairing UEs with an AP. Embodiments may also provide for pairing different APs with each other. For example, APs are equipped with more advanced hardware, compared to UEs, and the implementation complexity of NOMA is more acceptable for APs, so such pairing may be advantageous in some embodiments.

Figure 4:
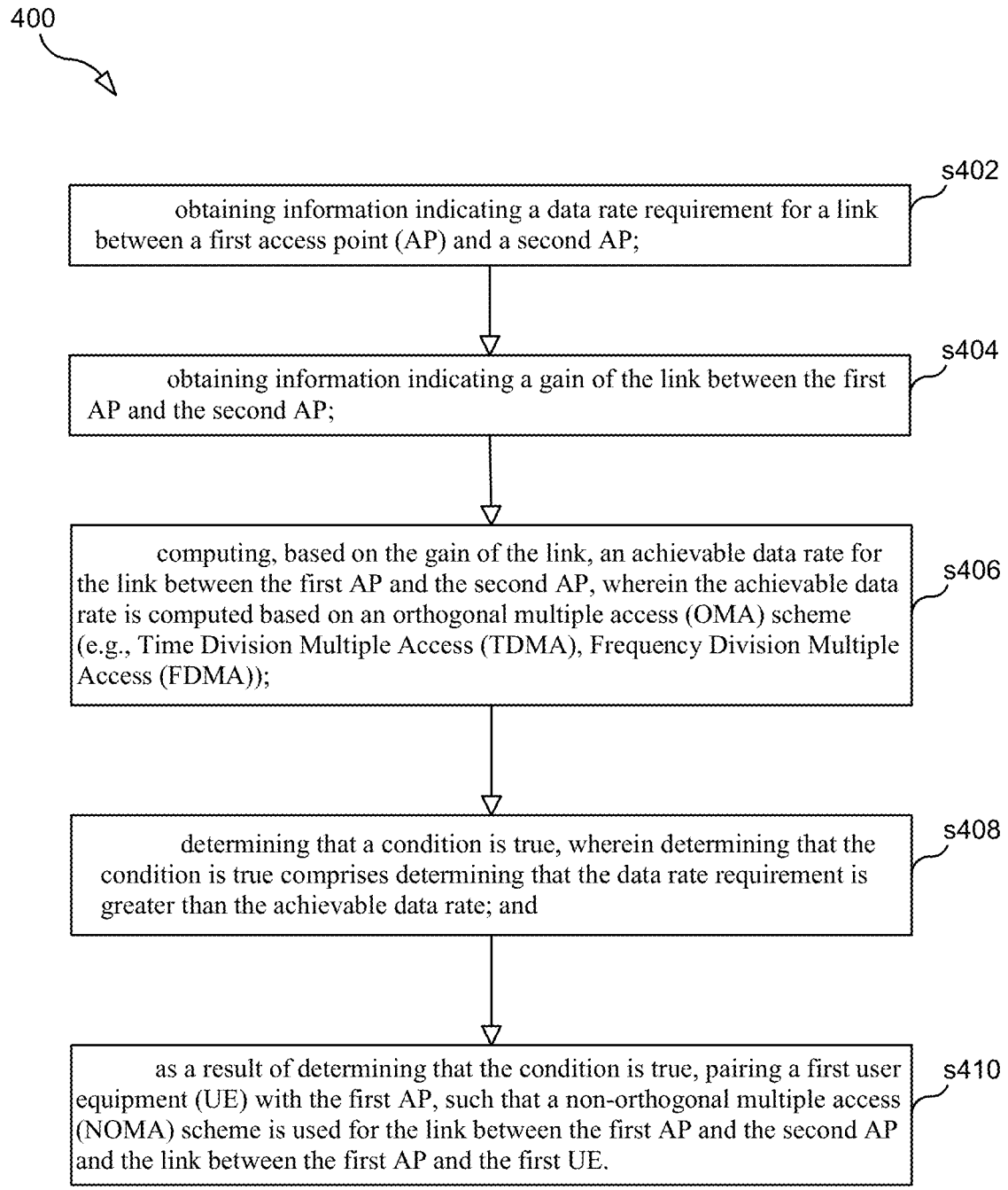
FIG. 4 is a flow chart illustrating a process according to one embodiment.

FIG. 4 is a flow chart illustrating process 400, for adaptively integrating access and backhaul links, according to some embodiments. Process 400 may be performed by a node (e.g., an AP or UE) in a network. As shown in FIG. 4, process 400 may begin in step s402 in which a node obtains information indicating a data rate requirement for a link between a first access point (AP) and a second AP. In step s404, the node obtains information indicating a gain of the link between the first AP and the second AP. In step s406, the node computes, based on the gain of the link, an achievable data rate for the link between the first AP and the second AP. The achievable data rate is computed based on an orthogonal multiple access (OMA) scheme (e.g., Time Division Multiple Access (TDMA), Frequency Division Multiple Access (FDMA)). In step s408, the node determines that a condition is true. Determining that the condition is true comprises determining that the data rate requirement is greater than the achievable data rate. In step s410, as a result of determining that the condition is true, the node pairs a first user equipment (UE) with the first AP, such that a non-orthogonal multiple access (NOMA) scheme is used for the link between the first AP and the second AP and the link between the first AP and the first UE.

In embodiments, the NOMA scheme is used for one or more of data uplink and/or data downlink. In embodiments, the first AP is scheduled to transmit data to the second AP during a first time slot and using a first set of one or more frequencies, and pairing a first UE with the first AP comprises the second AP scheduling the first UE to transmit data to the second AP during the first time slot and using the first set of frequencies. In embodiments, the method further includes a step in which the node computes, based on the gain of the link, a second achievable data rate for the link between the first AP and the second AP, where the second achievable data rate is computed based on a NOMA scheme where the first UE and the first AP are paired; and a step in which the node determines that a second condition is true, where determining that the second condition is true comprises determining that the data rate requirement is greater than the second achievable data rate. The method further includes, as a result of determining that the second condition is true, a step in which the node pairs both the first UE and a second UE with the first AP, such that a NOMA scheme is used for the link between the first AP and the second AP, the link between the first AP and the first UE, and the link between the first AP and the second UE.

In embodiments, pairing the first UE with the first AP further comprises pairing a plurality of other UEs with the first AP, wherein the first UE and the plurality of other UEs are selected to achieve the data rate requirement while minimizing a complexity measure for using the NOMA scheme. In embodiments, the method further includes a step in which the node obtains data rate requirements for the plurality of other UEs, and wherein the first UE and the plurality of other UEs are further selected based on the data rate requirements for the plurality of other UEs. In embodiments, the method further includes a first informing step in which the node informs the first UE that the first UE is selected to use the NOMA scheme for the link between the first AP and the first UE. The first informing step further includes the node sending an indication to the first UE of a beamforming power level. In embodiments, the method further includes a second informing step in which the node informs a UE, for each of the first UE and any unpaired UEs, about a timing information for the UE. In embodiments, the first informing step further comprises the node informing each UE that has been paired with the first AP, that the UE is selected to use the NOMA scheme for the link between the first AP to the UE.

In embodiments, computing, based on the gain, the achievable data rate for the link between the first AP and the second AP, comprises calculating the achievable data rate ($R_{AP1-AP2,OMA}$) according to:

$$R_{AP1-AP2,OMA} = \alpha_0 \log_2\left(1 + \frac{Pg}{\alpha_0}\right)\left[\frac{bit}{symbol}\right]$$

where P is the transmission power of the first AP, g is the gain corresponding to the link between the first AP and the second AP, and $\alpha_0$ is a portion of time allocated for data transfer in the link between the first AP and the second AP.

Figure 5:
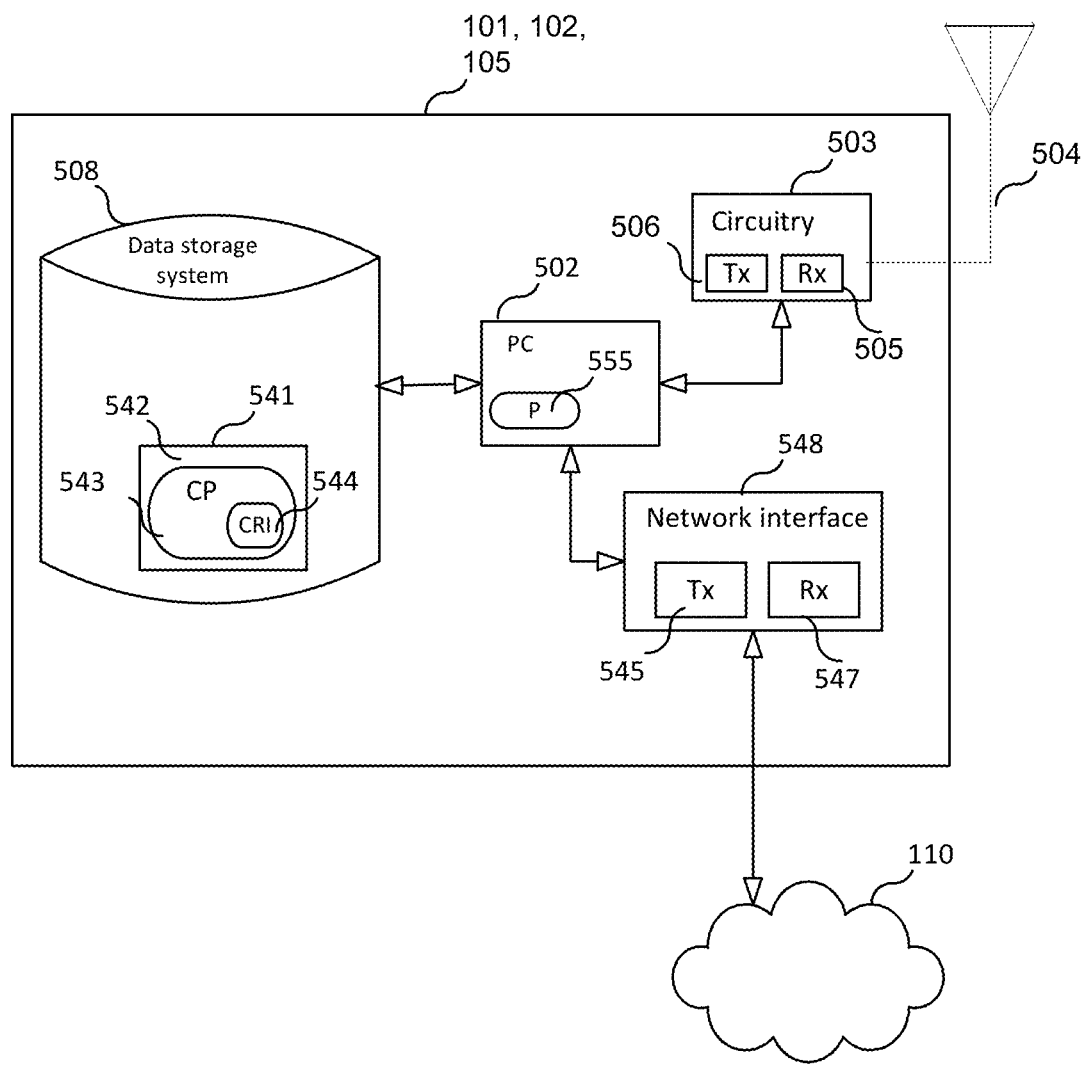
FIG. 5 is a block diagram of a node according to one embodiment.

FIG. 5 is a block diagram of a node (such as UE 101, 102, AP 105) according to some embodiments. As shown in FIG. 5, the node may comprise: processing circuitry 502, which may include one or more processors (P) 555 (e.g., a general purpose microprocessor and/or one or more other processors, such as an application specific integrated circuit (ASIC), field-programmable gate arrays (FPGAs), and the like); a network interface 548 comprising a transmitter (Tx) 545 and a receiver (Rx) 547 for enabling the node to transmit data to and receive data from other nodes connected to a network 110 (e.g., an Internet Protocol (IP) network) to which network interface 548 is connected; circuitry 503 (e.g., radio transceiver circuitry comprising an Rx 505 and a Tx 506) coupled to an antenna system 504 for wireless communication with UEs); and local storage unit (a.k.a., "data storage system") 508, which may include one or more non-volatile storage devices and/or one or more volatile storage devices (e.g., random access memory (RAM)). In embodiments where DPA 502 includes a programmable processor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited to, magnetic media (e.g., a hard disk), optical media, memory devices (e.g., random access memory, flash memory), and the like. In some embodiments, the CRI 544 of computer program 543 is configured such that when executed by data processing apparatus 502, the CRI causes the node to perform steps described herein (e.g., steps described herein with reference to the flow charts and/or message flow diagrams). In other embodiments, the node may be configured to perform steps described herein without the need for code. That is, for example, DPA 502 may consist merely of one or more ASICs. Hence, the features of the embodiments described herein may be implemented in hardware and/or software.

Figure 6:
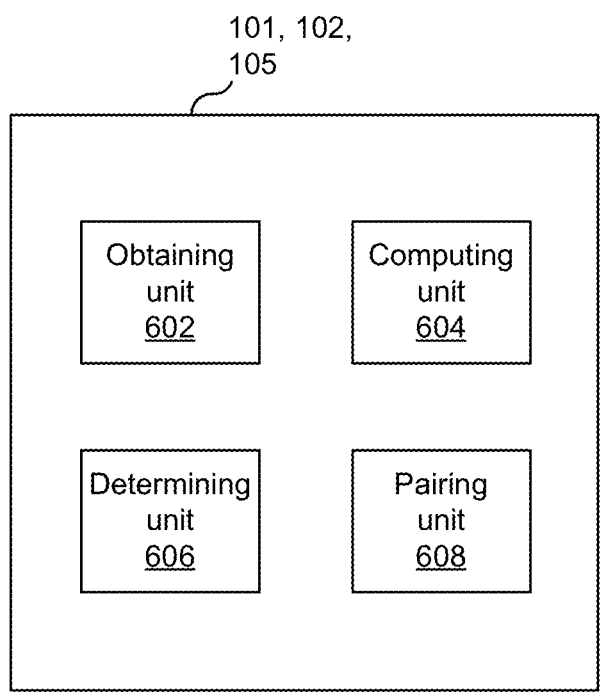
FIG. 6 is a diagram showing functional units of a node according to one embodiment.

FIG. 6 is a diagram showing functional units of a node (such as UE 101, 102, AP 105) according to some embodiments. As shown in FIG. 6, the node includes an obtaining unit 602 for: a) obtaining information indicating a data rate requirement for a link between a first access point (AP) and a second AP; and b) obtaining information indicating a gain of the link between the first AP and the second AP. The node further includes a computing unit 604 for computing, based on the gain of the link, an achievable data rate for the link between the first AP and the second AP, wherein the achievable data rate is computed based on an orthogonal multiple access (OMA) scheme (e.g., Time Division Multiple Access (TDMA), Frequency Division Multiple Access (FDMA)). The node further includes a determining unit 606 for determining that a condition is true, wherein determining that the condition is true comprises determining that the data rate requirement is greater than the achievable data rate. The node further includes a pairing unit 608 for, as a result of the determining unit 606 determining that the condition is true, pairing a first user equipment (UE) with the first AP, such that a non-orthogonal multiple access (NOMA) scheme is used for the link between the first AP and the second AP and the link between the first AP and the first UE.

Figure 7:
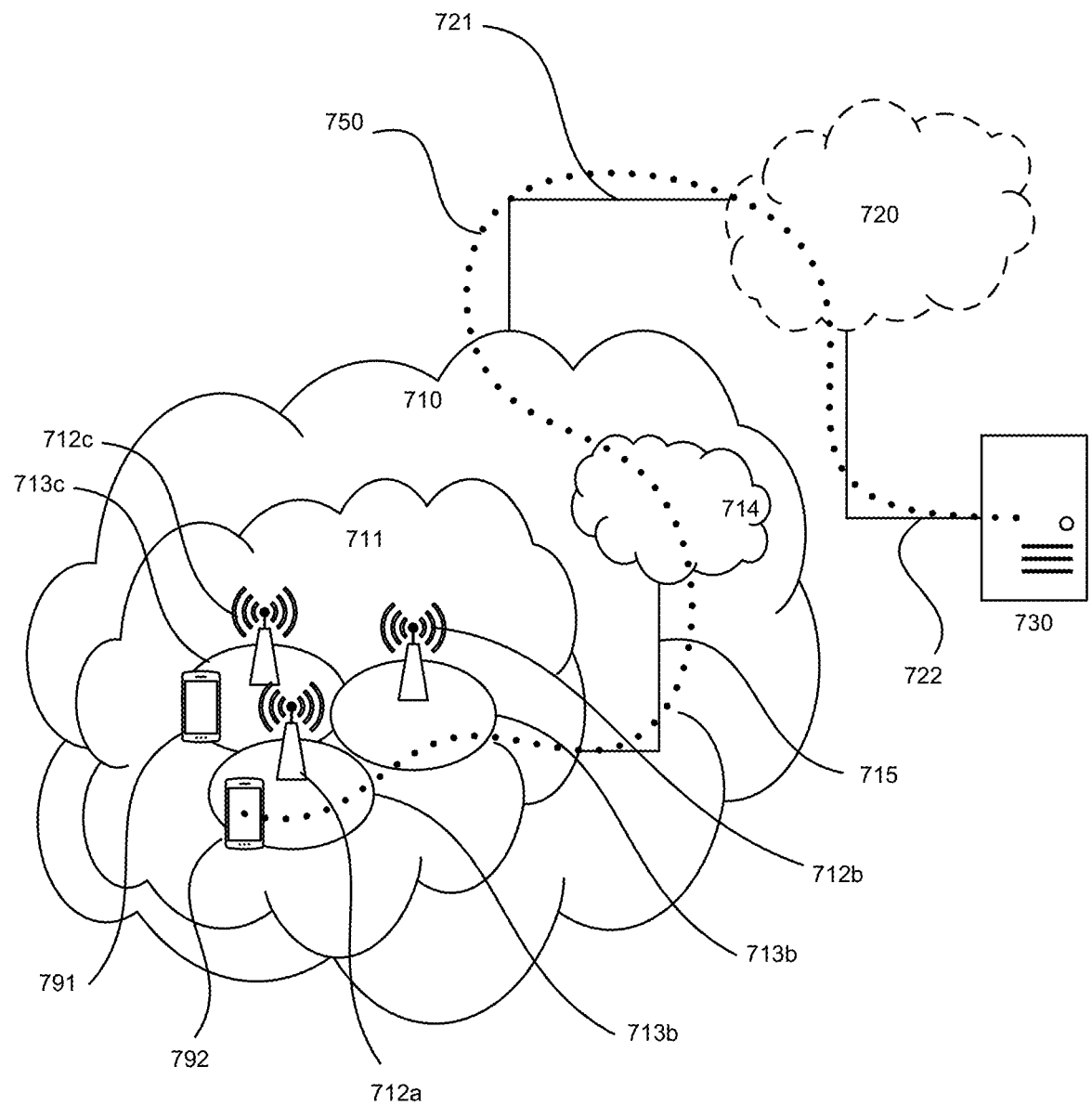
FIG. 7 schematically illustrates a telecommunication network connected via an intermediate network to a host computer.

FIG. 7 illustrates a telecommunication network connected via an intermediate network to a host computer in accordance with some embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of APs (hereafter base stations) 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8, which illustrates a host computer communicating via a base station with a user equipment over a partially wireless connection in accordance with some embodiments. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 1012 and provide user data in response to the request data. OTT connection 850 may transfer both the request data and the user data. Client application 832 may interact with the user to generate the user data that it provides.

Figure 8:
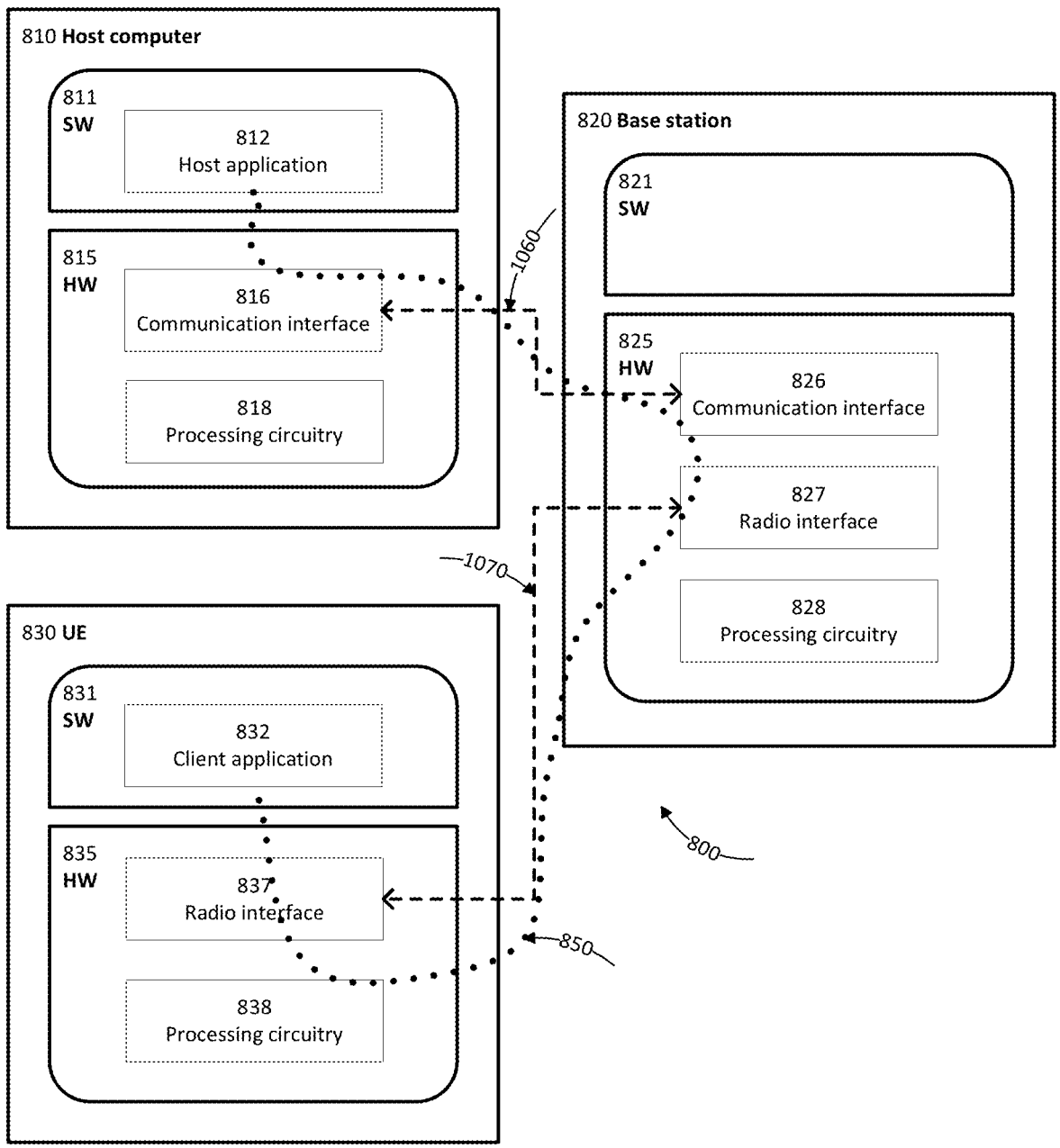
FIG. 8 is a generalized block diagram of a host computer communicating via a base station with a user equipment over a partially wireless connection.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

Figure 9:
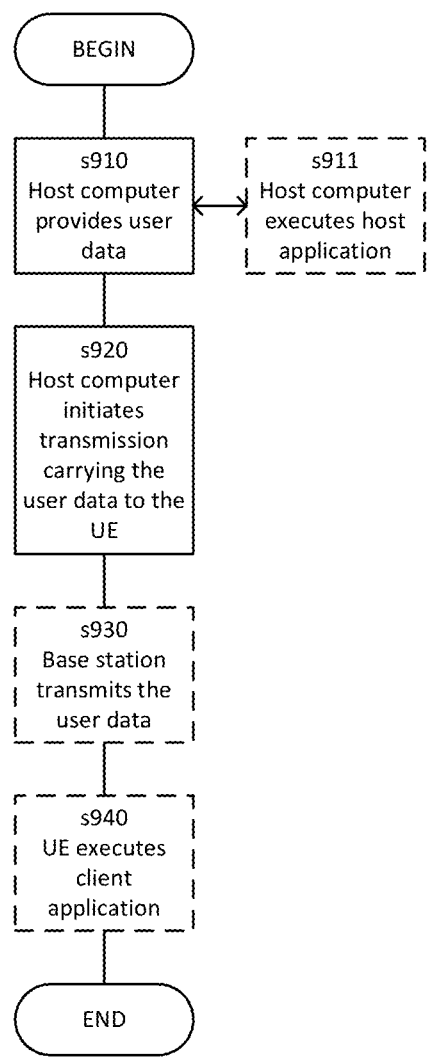
FIG. 9 is a flowchart illustrating a method implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIG. 7 and FIG. 8. In step S910, the host computer provides user data. In substep S911 (which may be optional) of step S910, the host computer provides the user data by executing a host application. In step S920, the host computer initiates a transmission carrying the user data to the UE. In step S930 (which may be optional), the base station transmits to the UE the user data which was carried in the transmission that the host computer initiated, in accordance with the teachings of the embodiments described throughout this disclosure. In step S940 (which may also be optional), the UE executes a client application associated with the host application executed by the host computer.

Figure 10:
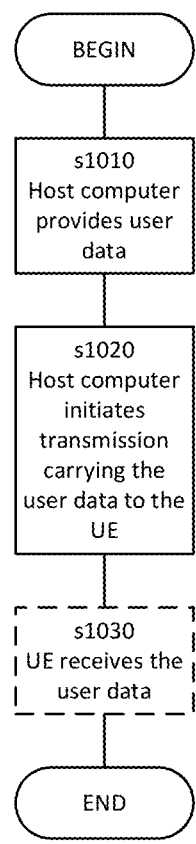
FIG. 10 is a flowchart illustrating a method implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 10 will be included in this section. In step S1010 of the method, the host computer provides user data. In an optional substep (not shown) the host computer provides the user data by executing a host application. In step S1020, the host computer initiates a transmission carrying the user data to the UE. The transmission may pass via the base station, in accordance with the teachings of the embodiments described throughout this disclosure. In step S1030 (which may be optional), the UE receives the user data carried in the transmission.

Figure 11:
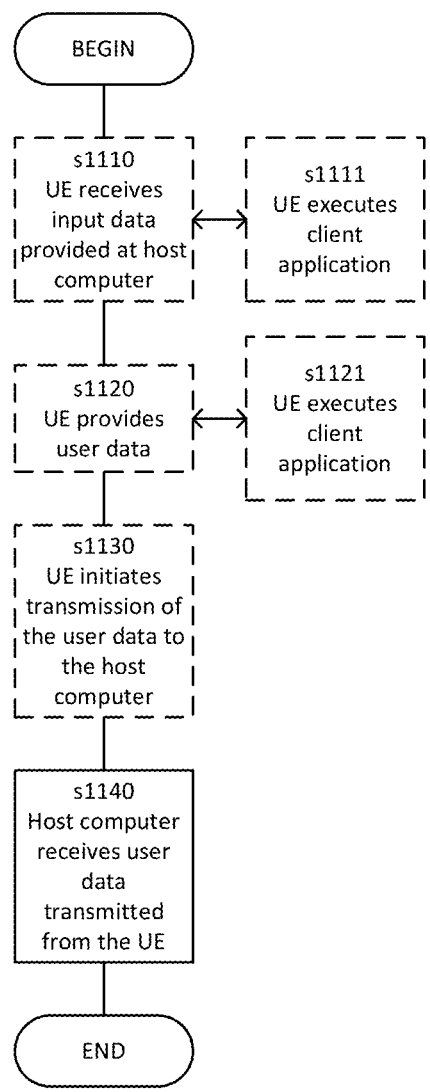
FIG. 11 is a flowchart illustrating a method implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 11 will be included in this section. In step S1110 (which may be optional), the UE receives input data provided by the host computer. Additionally or alternatively, in step S1120, the UE provides user data. In substep S1121 (which may be optional) of step S1120, the UE provides the user data by executing a client application. In substep S1111 (which may be optional) of step S1110, the UE executes a client application which provides the user data in reaction to the received input data provided by the host computer. In providing the user data, the executed client application may further consider user input received from the user. Regardless of the specific manner in which the user data was provided, the UE initiates, in substep 51130 (which may be optional), transmission of the user data to the host computer. In step S1140 of the method, the host computer receives the user data transmitted from the UE, in accordance with the teachings of the embodiments described throughout this disclosure.

Figure 12:
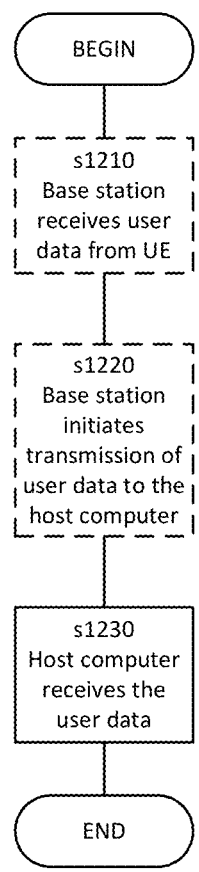
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 12 will be included in this section. In step S1210 (which may be optional), in accordance with the teachings of the embodiments described throughout this disclosure, the base station receives user data from the UE. In step S1220 (which may be optional), the base station initiates transmission of the received user data to the host computer. In step S1230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for adaptively integrating access and backhaul links, the method comprising:
   obtaining information indicating a data rate requirement for a link between a first access point (AP) and a second AP;
   obtaining information indicating a gain of the link between the first AP and the second AP;
   computing, based on the gain of the link, an achievable data rate for the link between the first AP and the second AP, wherein the achievable data rate is computed based on an orthogonal multiple access (OMA) scheme;
   determining that a condition is true, wherein determining that the condition is true comprises determining that the data rate requirement for the link between the first AP and the second AP is greater than the computed achievable data rate; and
   as a result of determining that the condition is true, pairing a first user equipment (UE) with the first AP such that a non-orthogonal multiple access (NOMA) scheme is used for the link between the first AP and the second AP and the link between the first AP and the first UE.

2. The method of claim 1, wherein the NOMA scheme is used for one or more of data uplink and/or data downlink.

3. The method of claim 1, wherein
the first AP is scheduled to transmit data to the second AP during a first time slot and using a first set of one or more frequencies, and
pairing a first UE with the first AP comprises the second AP scheduling the first UE to transmit data to the second AP during the first time slot and using the first set of frequencies.

4. The method of claim 1, further comprising:
computing, based on the gain of the link, a second achievable data rate for the link between the first AP and the second AP, wherein the second achievable data rate is computed based on a NOMA scheme where the first UE and the first AP are paired;
determining that a second condition is true, wherein determining that the second condition is true comprises determining that the data rate requirement is greater than the second achievable data rate; and
as a result of determining that the second condition is true, pairing both the first UE and a second UE with the first AP, such that a NOMA scheme is used for the link between the first AP and the second AP, the link between the first AP and the first UE, and the link between the first AP and the second UE.

5. The method of claim 1, wherein pairing the first UE with the first AP further comprises pairing a plurality of other UEs with the first AP, wherein the first UE and the plurality of other UEs are selected to achieve the data rate requirement while minimizing a complexity measure for using the NOMA scheme.

6. The method of claim 5, further comprising obtaining data rate requirements for the plurality of other UEs, and wherein the first UE and the plurality of other UEs are further selected based on the data rate requirements for the plurality of other UEs.

7. The method of claim 1, further comprising:
a first informing step comprising informing the first UE that the first UE is selected to use the NOMA scheme for the link between the first AP and the first UE, wherein the first informing step further comprises sending an indication to the first UE of a beamforming power level.

8. The method of claim 1, further comprising:
a second informing step comprising informing a UE, for each of the first UE and any unpaired UEs, about a timing information for the UE.

9. The method of claim 7, wherein the first informing step further comprises informing each UE that has been paired with the first AP, that the UE is selected to use the NOMA scheme for the link between the first AP to the UE.

10. The method of claim 1, wherein computing, based on the gain, the achievable data rate for the link between the first AP and the second AP, comprises calculating the achievable data rate ($R_{AP1-AP2,OMA}$) according to:

$$R_{AP1-AP2,OMA} = \alpha_0 \log_2\left(1 + \frac{Pg}{\alpha_0}\right)\left[\frac{\text{bit}}{\text{symbol}}\right]$$

where P is the transmission power of the first AP, g is the gain corresponding to the link between the first AP and the second AP, and $\alpha_0$ is a portion of time allocated for data transfer in the link between the first AP and the second AP.

11. A network node, the network node comprising:
a transmitter;
a receiver;
a memory; and
processing circuitry coupled to the transmitter, receiver, and the memory, wherein the access point is configured to:
obtain information indicating a data rate requirement for a link between a first access point (AP) and a second AP;
obtain information indicating a gain of the link between the first AP and the second AP;
compute, based on the gain of the link, an achievable data rate for the link between the first AP and the second AP, wherein the achievable data rate is computed based on an orthogonal multiple access (OMA) scheme;
determine that a condition is true, wherein determining that the condition is true comprises determining that the data rate requirement is greater than the achievable data rate; and
as a result of determining that the condition is true, pair a first user equipment, UE with the first AP, such that a non-orthogonal multiple access (NOMA) scheme is used for the link between the first AP and the second AP and the link between the first AP and the first UE.

12. The network node of claim 11, wherein the NOMA scheme is used for one or more of data uplink and/or data downlink.

13. The network node of claim 11, wherein
the first AP is scheduled to transmit data to the second AP during a first time slot and using a first set of one or more frequencies, and
pairing a first UE with the first AP comprises the second AP scheduling the first UE to transmit data to the second AP during the first time slot and using the first set of frequencies.

14. The network node of claim 11, further adapted to:
compute, based on the gain of the link, a second achievable data rate for the link between the first AP and the second AP, wherein the second achievable data rate is computed based on a NOMA scheme where the first UE and the first AP are paired;
determine that a second condition is true, wherein determining that the second condition is true comprises determining that the data rate requirement is greater than the second achievable data rate; and
as a result of determining that the second condition is true, pair both the first UE and a second UE with the first AP, such that a NOMA scheme is used for the link between the first AP and the second AP, the link between the first AP and the first UE, and the link between the first AP and the second UE.

15. The network node of claim 11, wherein pairing the first UE with the first AP further comprises pairing a plurality of other UEs with the first AP, wherein the first UE and the plurality of other UEs are selected to achieve the data rate requirement while minimizing a complexity measure for using the NOMA scheme.

16. A computer program product comprising a non-transitory computer readable medium storing a computer program comprising instructions which, when executed on at least one processor of a network node configures the network node to:

obtain information indicating a data rate requirement for a link between a first access point (AP) and a second AP;
obtain information indicating a gain of the link between the first AP and the second AP;
compute, based on the gain of the link, an achievable data rate for the link between the first AP and the second AP, wherein the achievable data rate is computed based on an orthogonal multiple access (OMA) scheme;
determine that a condition is true, wherein determining that the condition is true comprises determining that the data rate requirement is greater than the achievable data rate; and
as a result of determining that the condition is true, pair a first user equipment, UE with the first AP, such that a non-orthogonal multiple access (NOMA) scheme is used for the link between the first AP and the second AP and the link between the first AP and the first UE.

* * * * *